D. B. LUTEN.

CONCRETE BRIDGE.

APPLICATION FILED JUNE 24, 1914.

Reissued Nov. 24, 1914.

13,833.

WITNESSES:

Frank A. Fahle

Josephine Gasper

INVENTOR

Daniel B. Luten,

BY

Hood & Schley

ATTORNEYS

UNITED STATES PATENT OFFICE.

DANIEL B. LUTEN, OF INDIANAPOLIS, INDIANA.

CONCRETE BRIDGE.

13,833. Specification of Reissued Letters Patent. Reissued Nov. 24, 1914.

Original application filed November 1, 1906, Serial No. 341,605. Divided and application filed March 29, 1909, Serial No. 486,643. Original No. 1,060,920, dated May 6, 1913. Application for reissue filed June 24, 1914. Serial No. 847,136.

*To all whom it may concern:*

Be it known that I, DANIEL B. LUTEN, a citizen of the United States, residing at Indianapolis, in the county of Marion and State of Indiana, have invented certain new and useful Improvements in Concrete Bridges, of which the following is a specification.

The object of my invention is to produce a concrete structure under such conditions that the loads thereof will be properly sustained, and that if there be any cracking it will be along predetermined lines which will neither reduce the strength of the structure nor affect its appearance; to construct an arch structure or girder in successive rings or sections which will be subjected to the stresses of their own weight at different periods in order that the settling and loading stresses in one ring or section may be caused to counteract similar stresses in the adjacent ring or section, especially when the latter carries a spandrel; and to provide such improvements in details and methods of construction as will hereinafter be pointed out.

This application is a division of an application filed by me November 1, 1906, Serial No. 341,605.

The accompanying drawings illustrate my invention.

Figure 1:
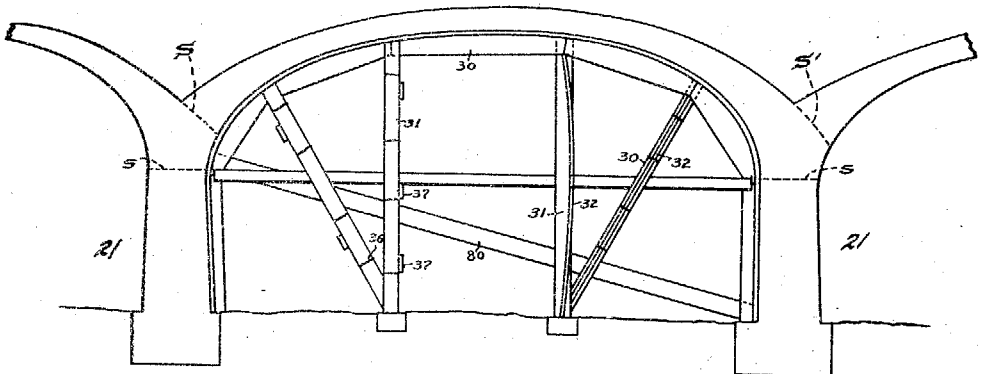
Figure 2:
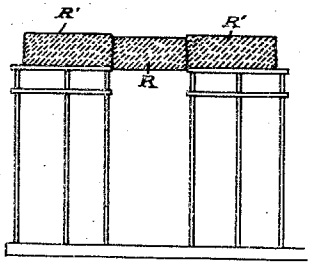
Figure 3:
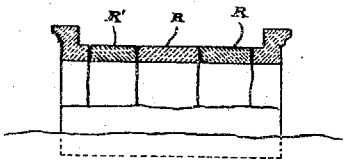

Figure 1 is a longitudinal vertical section of an arch supported upon its centering. Fig. 2 is a transverse section of an arch showing the preferred manner of constructing the same in longitudinal rings or sections. Fig. 3 is a transverse section of a complete arch.

The abutment or piers 21 are built to about the springing lines *s*, and centering is erected for one of the arches at the middle of the axis thereof, this centering being wide enough to support a ring or section of reasonable width. The concrete is laid upon this centering, and in order that the load of the concrete may be uniformly applied I prefer to place the concrete simultaneously at the crown and the haunches, depositing concrete in opposite directions from these points until the entire ring is produced from skewback S to skewback S′, thus forming a ring or section R. By depositing the concrete in this way the arch is loaded at the crown and haunches simultaneously and there is but slight tendency for the ring to become distorted. After a ring has been produced and allowed to set, the centering supporting it will be struck, the arch ring thereupon assuming the stresses of its own load, generally by sinking slightly at the crown and correspondingly rising at the haunches. Two sets of centering may then be arranged at opposite ends of the completed arch ring (see Fig. 2) and additional arch rings R′ R′ are then produced on these sets of centering in the same manner, allowed to set, and the centering then withdrawn, the operation being repeated as many times as may be necessary to complete the span.

The arches are completed in succession from skewback to skewback in the manner already described, the spandrel walls and the spandrel posts and the rings supporting the spandrel walls being left until the last. The adjacent sections having taken their settlement, the spandrel walls and their supporting rings will not settle materially and the usual cracks which occur in the spandrels near the haunches do not appear. This is because the outer rings and the spandrel walls thereupon are supported against such settling by the already settled intermediate rings, contiguous rings being of course suitably bonded together, so that the intermediate rings take a rather abnormal settlement and by taking it help to support the exterior rings and to prevent the latter from taking even the ordinary settlement that otherwise would have been theirs. After the end rings of the arches are completed, the centering may be eased off before the spandrels are completed. Fig. 3 shows a transverse section through a complete arch having five rings or sections, showing the spandrels supported on the end rings or sections. A saving in centering may thus be effected by the repeated use of the centering in the same span, and a balanced structure is produced in which unsightly cracks in the spandrel walls are largely or wholly avoided.

I claim as my invention:

1. That improvement in the art of building a concrete arch, comprising erecting on supports an intermediate longitudinal section, permitting it to harden, then lowering the supports under that section, and subsequently constructing longitudinal sections contiguous to said intermediate section and on opposite sides thereof and relating such subsequently constructed sections to the intermediate section so that shear can be transmitted between contiguous sections.

2. That improvement in the art of building an arch, comprising erecting on supports an intermediate longitudinal section, permitting it to harden, then lowering the supports under that section, and subsequently constructing longitudinal sections and bonding them to the first sections contiguous to said intermediate section and on opposite sides thereof.

3. That improvement in the art of erecting concrete arches, which consists in separately erecting upon supports three contiguous arch rings in two sets, one set comprising two rings and the other set comprising one ring, and relating such two sets so that shear can be transmitted from one to the other, one of the sets being allowed to harden and its supports being removed before the erection of the other set, thereby balancing the effect of one set in its hardened condition against the effect of the other set.

4. That improvement in the art of building a concrete arch, comprising erecting on false-work supports an intermediate longitudinal section between proposed end sections, permitting it to harden, then lowering the false-work supports under that section, and subsequently constructing on false-work supports the proposed end sections and bonding them to the intermediate section.

5. That improvement in the art of building an arch, comprising erecting on false-work supports an intermediate longitudinal section between proposed end sections, then lowering the false-work supports under that section, subsequently constructing on false-work supports the proposed end sections and bonding them to the intermediate section, and erecting superstructures on said end sections.

6. An arch comprising an intermediate longitudinal ring or section, and a pair of longitudinal rings or sections contiguous to said intermediate section and on opposite sides thereof, said intermediate ring or section being bonded to the contiguous rings or sections and having been completed and subjected to load stresses prior to the production of said contiguous rings or sections.

7. A concrete arch comprising an intermediate longitudinal ring or section, and a pair of longitudinal rings or sections contiguous to said intermediate section and on opposite sides thereof and related thereto so that shear can be transmitted between contiguous rings or sections, said intermediate ring or section having been completed and subjected to load stresses prior to the production of said contiguous rings or sections.

8. An arch comprising three contiguous arch rings or sections which have been built in two sets, one of the sets comprising the two outer rings or sections and the other comprising the intermediate ring or section and contiguous rings or sections being related to one another so that shear may be transmitted between them, and one of the sets having been allowed to harden and its supports having been removed before the erection of the other set, so that the effect of one set in its hardened condition is balanced against the effect of the other set.

9. A concrete arch comprising an intermediate longitudinal ring or section, and a pair of longitudinal rings or sections contiguous to said intermediate section and on opposite sides thereof, said intermediate ring or section being bonded to the contiguous rings or sections and having been completed and subjected to load stresses prior to the production of said contiguous rings or sections.

10. A bridge comprising an intermediate longitudinal section and two end sections, the intermediate section having been constructed and allowed to harden and to take its load stresses before the construction of the end sections, and the end sections being bonded to the intermediate section.

11. A bridge comprising an intermediate longitudinal section and two end sections, the intermediate section having been constructed and allowed to harden and to take its load stresses before the construction of the end sections, the end sections being bonded to the intermediate section, and a superstructure erected on said end sections.

12. A bridge comprising one or more intermediate longitudinal sections and two end sections, the various sections being contiguous each with its neighbor or neighbors and all being bonded together, and the intermediate section or sections having a larger settlement and the end sections a smaller settlement than they would have if the other sections were absent.

13. A bridge comprising one or more intermediate longitudinal sections and two end sections, the various sections being contiguous each with its neighbor or neighbors and all being bonded together, and the intermediate section or sections having a larger settlement and the end sections a smaller settlement than they would have if the other sections were absent, and superstructures erected on said end sections.

In testimony whereof, I hereunto set my hand at Indianapolis, in the county of Marion and State of Indiana, this 18th day of June, 1914.

DANIEL B. LUTEN.

Witnesses:

JOSEPHINE GASPER,
G. B. SCHLEY.

Copies of this patent may be obtained for five cents each, by addressing the "Commissioner of Patents. Washington, D. C."